US010951456B2

(12) United States Patent
Nakamura et al.

(10) Patent No.: US 10,951,456 B2
(45) Date of Patent: Mar. 16, 2021

(54) BASE STATION APPARATUS, TERMINAL APPARATUS, AND COMMUNICATION METHOD

(71) Applicant: SHARP KABUSHIKI KAISHA, Sakai (JP)

(72) Inventors: Osamu Nakamura, Sakai (JP); Jungo Goto, Sakai (JP); Ryota Yamada, Sakai (JP); Takashi Yoshimoto, Sakai (JP); Yasuhiro Hamaguchi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 340 days.

(21) Appl. No.: 16/088,791

(22) PCT Filed: Feb. 23, 2017

(86) PCT No.: PCT/JP2017/006873
§ 371 (c)(1),
(2) Date: Sep. 26, 2018

(87) PCT Pub. No.: WO2017/169367
PCT Pub. Date: Oct. 5, 2017

(65) Prior Publication Data
US 2020/0322208 A1   Oct. 8, 2020

(30) Foreign Application Priority Data
Mar. 31, 2016   (JP) .............................. JP2016-070495

(51) Int. Cl.
*H04L 27/34*   (2006.01)
*H04W 76/11*   (2018.01)
(Continued)

(52) U.S. Cl.
CPC ........ *H04L 27/3488* (2013.01); *H04L 1/0005* (2013.01); *H04L 1/0026* (2013.01);
(Continued)

(58) Field of Classification Search
None
See application file for complete search history.

(56) References Cited

U.S. PATENT DOCUMENTS

2015/0312074 A1*  10/2015  Zhu ...................... H04W 52/16
                                                       370/329
2016/0037460 A1    2/2016  Benjebbour et al.
(Continued)

FOREIGN PATENT DOCUMENTS

CN   104660544 A     5/2015
EP     3073696 A1 *  9/2016  ........... H04L 1/0016

OTHER PUBLICATIONS

"3rd Generation Partnership Project; Technical Specification Group Radio Access Network; Evolved Universal Terrestrial Radio Access (E-UTRA); Physical layer procedures (Release 12)", 3GPP TS 36.213 V12.5.0 (Mar. 2015).
(Continued)

*Primary Examiner* — Chi H Pham
*Assistant Examiner* — Vladislav Y Agureyev
(74) *Attorney, Agent, or Firm* — ScienBiziP, P.C.

(57) ABSTRACT

The present invention relates to a base station apparatus, a terminal apparatus, and a communication method. In a case that Multi-User Superposition Transmission (MUST) is applied, the transmit power for applying 256 QAM is insufficient. MUST is efficiently applied in an environment in which an MCS table including 256 QAM is configured for use. The base station includes an MCS configuration unit configured to hold a first table including MCS indices that include 256 QAM, and a second table not including 256 QAM, and in a case of performing MUST, configure an MCS not including 256QAM for downlink data of the second terminal, and a PDSCH generating unit configured to generate, by use of MUST, downlink data of the first
(Continued)

terminal and downlink data of the second terminal that are generated based on the MCS indices configured.

10 Claims, 8 Drawing Sheets

(51) Int. Cl.
*H04W 76/27* (2018.01)
*H04L 1/00* (2006.01)
*H04W 52/26* (2009.01)
*H04W 72/04* (2009.01)

(52) U.S. Cl.
CPC ......... *H04L 1/0061* (2013.01); *H04W 52/262* (2013.01); *H04W 72/042* (2013.01); *H04W 76/11* (2018.02); *H04W 76/27* (2018.02)

(56) References Cited

U.S. PATENT DOCUMENTS

| | | | |
|---|---|---|---|
| 2016/0112995 A1* | 4/2016 | Chen | H04L 27/02 370/329 |
| 2016/0269218 A1 | 9/2016 | Zhang et al. | |
| 2016/0330695 A1* | 11/2016 | Benjebbour | H04W 72/042 |
| 2016/0366003 A1* | 12/2016 | Kwon | H04L 1/007 |
| 2017/0013599 A1* | 1/2017 | Sun | H04L 5/0053 |
| 2017/0041906 A1* | 2/2017 | Tsai | H04L 1/0009 |
| 2017/0070377 A1* | 3/2017 | Sawahashi | H04L 25/03305 |
| 2017/0135114 A1* | 5/2017 | Hwang | H04J 11/00 |
| 2017/0331662 A1* | 11/2017 | Sun | H04L 27/362 |
| 2017/0338915 A1* | 11/2017 | Kim | H04J 11/004 |
| 2018/0048503 A1* | 2/2018 | Kim | H04L 27/2605 |
| 2018/0070265 A1* | 3/2018 | Seo | H04L 1/1812 |
| 2018/0160372 A1* | 6/2018 | Benjebbour | H04W 52/241 |
| 2018/0205511 A1* | 7/2018 | Li | H04L 1/1812 |
| 2018/0213366 A1* | 7/2018 | Seo | H04L 27/26 |
| 2018/0262288 A1* | 9/2018 | Gao | H04W 52/346 |
| 2018/0343046 A1* | 11/2018 | Park | H04B 7/0626 |
| 2018/0375626 A1* | 12/2018 | Kim | H04L 5/0048 |
| 2019/0013911 A1* | 1/2019 | Muruganathan | H04B 7/0632 |
| 2020/0328833 A1* | 10/2020 | Gao | H04L 5/0069 |

OTHER PUBLICATIONS

"3rd Generation Partnership Project; Technical Specification Group Radio Access Network; Study on Downlink Multiuser Superposition Transmission (MUST) for LTE (Release 13)", 3GPP TR 36.859 V13.0.0 (Dec. 2015).
Itri, "Downlink Control Signaling for MUST", R1-155554, 3GPP TSG RAN WG1 Meeting #82bis Oct. 5-9, 2015.

* cited by examiner

| MCS INDEX | MODULATION SCHEME | TBS INDEX |
|---|---|---|
| 0 | QPSK | 0 |
| 1 | QPSK | 1 |
| ⋮ | ⋮ | ⋮ |
| 8 | QPSK | 8 |
| 9 | QPSK | 9 |
| 10 | 16QAM | 9 |
| 11 | 16QAM | 10 |
| ⋮ | ⋮ | ⋮ |
| 15 | 16QAM | 14 |
| 16 | 16QAM | 15 |
| 17 | 64QAM | 15 |
| 18 | 64QAM | 16 |
| ⋮ | ⋮ | ⋮ |
| 28 | 64QAM | 26 |
| 29 | QPSK | reserved |
| 30 | 16QAM | |
| 31 | 64QAM | |

FIG. 2

| CQI INDEX | MODULATION SCHEME | CODING RATE X 1024 | FREQUENCY UTILIZATION EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 3

| MCS INDEX | MODULATION SCHEME | TBS INDEX |
|---|---|---|
| 0 | QPSK | 0 |
| ⋮ | ⋮ | ⋮ |
| 4 | QPSK | 8 |
| 5 | 16QAM | 10 |
| ⋮ | ⋮ | ⋮ |
| 10 | 16QAM | 15 |
| 11 | 64QAM | 16 |
| 12 | 64QAM | 17 |
| ⋮ | ⋮ | ⋮ |
| 19 | 64QAM | 24 |
| 20 | 256QAM | 25 |
| ⋮ | ⋮ | ⋮ |
| 27 | 256QAM | 33 |
| 28 | QPSK | reserved |
| 29 | 16QAM | |
| 30 | 64QAM | |
| 31 | 256QAM | |

FIG. 4

| CQI INDEX | MODULATION SCHEME | CODING RATE X 1024 | FREQUENCY UTILIZATION EFFICIENCY |
|---|---|---|---|
| 0 | OUT OF RANGE | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

FIG. 5

BASE STATION APPARATUS, TERMINAL APPARATUS, AND COMMUNICATION METHOD

TECHNICAL FIELD

The present invention relates to a base station apparatus, a terminal apparatus, and a communication method.

BACKGROUND ART

Due to the recent spread of smartphones, tablet terminals, and the like, the demand for high-speed wireless transmission has been increasing. The Third Generation Partnership Project (3GPP), one of the standardization bodies, standardizes Long Term Evolution (LTE). Quadrature Phase Shift Keying (QPSK), 16 Quadrature Amplitude Modulation (16 QAM) and 64 QAM are supported as modulation schemes in the downlink of LTE in Rel-11 or earlier releases. With QPSK, it is possible to transmit two bits per modulation symbol. With 16 QAM, it is possible to transmit four bits per modulation symbol. With 64 QAM, it is possible to transmit six bits per modulation symbol. This means that 16QAM has higher frequency utilization efficiency than QPSK. Furthermore, 64 QAM has higher frequency utilization efficiency than that of 16 QAM.

On the other hand, bit errors tend to occur as the number of bits per modulation symbol increases. In LTE, an adaptive modulation technology is adopted. With the adaptive modulation, a modulation scheme is adaptively selected according to the channel state between the base station apparatus (eNB, or evolved Node B) and the terminal apparatus (UE, or User Equipment).

In LTE, in addition to the modulation scheme, the coding rate of the error correction code is adaptively changed. For example, in LTE, the terminal apparatus estimates the downlink channel state based on the reference signal transmitted by the base station apparatus. The terminal apparatus notifies the base station apparatus of the channel quality information (CQI, or Channel Quality Indicator) that the terminal apparatus has generated based on the channel state. At this time, the terminal apparatus possesses a table, called a CQI table, that includes CQI of 4 bits (16 values), and notifies the base station apparatus of the index associated with the value of the CQI table nearest to the estimated CQI. The base station apparatus has the same CQI table as the terminal apparatus, and determines the corresponding CQI from the notified CQI index. The base station apparatus selects the modulation scheme and the coding rate (MCS, or Modulation and Coding Scheme) in consideration of the determined CQI. The base station apparatus performs downlink transmission using the selected MCS. The base station apparatus possesses a table called an MCS table, selects one of the MCSs included in the MCS table, notifies the index of the selected MCS to the terminal apparatus, and performs a data transmission using Physical Downlink Shared Channel (PDSCH) generated using the MCS that the base station apparatus has notified to the terminal apparatus.

The MCS table in LTE, instead of prescribing the modulation scheme and coding rate, prescribes the modulation scheme and the value called Transport Block Size (TBS). The coding rate is determined from the TBS and the allocated radio resources. The terminal apparatus has an MCS table similar to that of the base station apparatus, and determines the corresponding MCS from the notified MCS index. The terminal apparatus performs demodulation processing and decoding processing of the PDSCH using the determined MCS. In this way, in LTE, high throughput can be realized by adaptively selecting the MCS according to the channel state.

In LTE Rel-12, 256 QAM capable of transmitting 8 bits per modulation symbol was introduced (NPL 1). A terminal apparatus configured to use 256 QAM by the base station uses a CQI table and an MCS table that support up to 256 QAM instead of the CQI table and the MCS table that defines up to 64 QAM described above. By using 256 QAM, even higher throughput can be realized.

In LTE Rel-14, Multi-User Superposition Transmission (MUST) is studied (NPL). In MUST, the base station apparatus adds signals addressed to two terminal apparatuses at different transmit power ratios, and transmits the added signals to the two terminal apparatuses. At this time, a terminal apparatus, far from the base station, that has a low reception quality (distant terminal apparatus) and a terminal apparatus, close to the base station, that has a high reception quality (nearby terminal apparatus) are paired, and the distant terminal apparatus is allocated a large electric power while the nearby terminal apparatus is allocated the remaining electric power. Since noise and inter-cell interference, and the like are dominant in a signal, the distant terminal apparatus can suppress a signal addressed to the nearby terminal apparatus included in the signal to the distant terminal apparatus as degradation of the reception quality.

On the other hand, although a signal addressed to the distant terminal apparatus can cause a large interference, the nearby terminal apparatus can demodulate a signal addressed to the terminal apparatus by first canceling or suppressing the signal addressed to the distant terminal apparatus. In this manner, the base station multiplexes and transmits signals to a plurality of terminal apparatuses, and each of the plurality of terminal apparatuses, as a receiver, demultiplexes the signals, thus allowing the plurality of terminal apparatuses to communicate at the same frequency and at the same time. As a result, a communication opportunity of each terminal apparatus can be increased, thereby increasing throughput.

Multi-User Multiple Input Multiple Output (MU-MIMO) exists as a technology that allows a plurality of terminal apparatuses to communicate at the same frequency and at the same time. In MU-MIMO, different beams (or different transmit antennas) are used by a plurality of terminal apparatuses to perform communications. On the other hand, MUST allows a plurality of terminal apparatuses to perform communications, even using the same beam (or transmit antenna).

CITATION LIST

Non Patent Literature

NPL 1: "Physical layer procedures (Release 12)" 3 GPP TS 36.213 v12.5.0 (2015-03)

NPL 2: "Study on Downlink Multiuser Superposition Transmission (MUST) for LTE (Release 13)" 3GPP TR 36.859 v13.0.0 (2015-12).

SUMMARY OF INVENTION

Technical Problem

There is a high possibility that 256 QAM is applied to a terminal apparatus that is very close to the base station apparatus, because high reception power is required to accurately demodulate and decode the signal transmitted by 256 QAM. On the other hand, in MUST, most of the transmit power is allocated to a distant terminal apparatus, and the power allocated to a nearby terminal is at least less than half, and in some cases ¹/₁₀ or less. Therefore, the transmit power for applying 256 QAM is insufficient in a case that MUST is applied. Accordingly, in a case that the CQI table and the MCS table that support the 256 QAM are configured for use, the control of the MCS is restricted. As a result, it is conceivable that the gain from the MUST is decreased.

Also, the CQI table and the MCS table that support 256 QAM and also support QPSK, 16 QAM, and 64 QAM in addition to 256 QAM have less granularity than the CQI table and the MCS table that support QPSK, 16 QAM, and 64 QAM. Therefore, the CQI table and the MCS table that support 256 QAM are not capable of performing a highly accurate control. In a case that the CQI table and the MCS table that support the 256 QAM are configured for use, and MUST is applied, a control by use of an MCS table with a low accuracy is forced. As a result, it is conceivable that the gain from the MUST is decreased.

The present invention has been made in view of the above problem, and its object is to provide a base station apparatus, a terminal apparatus, and a communication method that can efficiently apply MUST in a case that a CQI table and an MCS table that support 256 QAM are configured.

Solution to Problem

To address the above-mentioned problem, the respective configuration of a base station apparatus and a terminal apparatus according to the present invention are as follows.

(1) In order to solve the above problem, a base station apparatus according to one aspect of the present invention is a base station apparatus for allocating a high transmission power to a first terminal apparatus and a low transmission power to a second terminal apparatus to perform signal-multiplexing by use of MUST, the base station apparatus including an MCS configuration unit configured to hold a first table including MCS indices that include 256 QAM, and a second table not including 256 QAM, and in a case of performing MUST, configure an MCS not including 256 QAM for downlink data of the second terminal apparatus, and a PDSCH generating unit configured to generate, by use of MUST, downlink data of the second terminal apparatus and downlink data of the first terminal apparatus that are generated based on the MCS indices configured.

(2) According to one aspect of the present invention, in a case of performing MUST, the MCS configuration unit configures an MCS for the downlink data of the second terminal apparatus based on the MCS indices constituting the first table.

(3) According to one aspect of the present invention, in a case of performing MUST, the MCS configuration unit configures an MCS for the downlink data of the second terminal apparatus based on the MCS indices constituting the second table.

(4) According to one aspect of the present invention, a terminal apparatus is a terminal apparatus for receiving a signal that has been signal-multiplexed by allocating a high transmission power to another terminal apparatus, or a signal that has not been signal-multiplexed, the terminal apparatus including an RRC configuration unit configured to configure either a first table including MCS indices that include 256 QAM or a second table not including 256 QAM, a control information extracting unit configured to determine an MCS being used for a signal based on the MCS indices, and a PDSCH demodulating unit configured to recognize a reception of a signal that is not signal-multiplexed and perform demodulation processing in a case that an MCS determined by the control information extracting unit is 256 QAM.

(5) According to one aspect of the present invention, a communication method is a communication method for allocating a high transmission power to a first terminal apparatus and a low transmission power to a second terminal apparatus to perform signal-multiplexing by use of MUST, the method including the steps of, in a case of performing MUST, configuring an MCS not including 256 QAM for downlink data of the second terminal apparatus, and generating, by use of MUST, downlink data of the second terminal apparatus and downlink data of the first terminal apparatus that are generated based on MCS indices configured.

Advantageous Effects of Invention

According to the present invention, in a case that the CQI table and the MCS table that support the 256 QAM are configured, MUST can be efficiently applied.

BRIEF DESCRIPTION OF DRAWINGS

FIG. 2 is a diagram illustrating an example of an MCS table in the 64 QAM mode according to the present embodiment.

FIG. 3 is a diagram illustrating an example of an CQI table in the 64 QAM mode according to the present embodiment.

FIG. 4 is a diagram illustrating an example of an MCS table in the 256 QAM mode according to the present embodiment.

FIG. 5 is a diagram illustrating an example of a CQI table in the 256 QAM mode according to the present embodiment.

DESCRIPTION OF EMBODIMENTS

Figure 1:
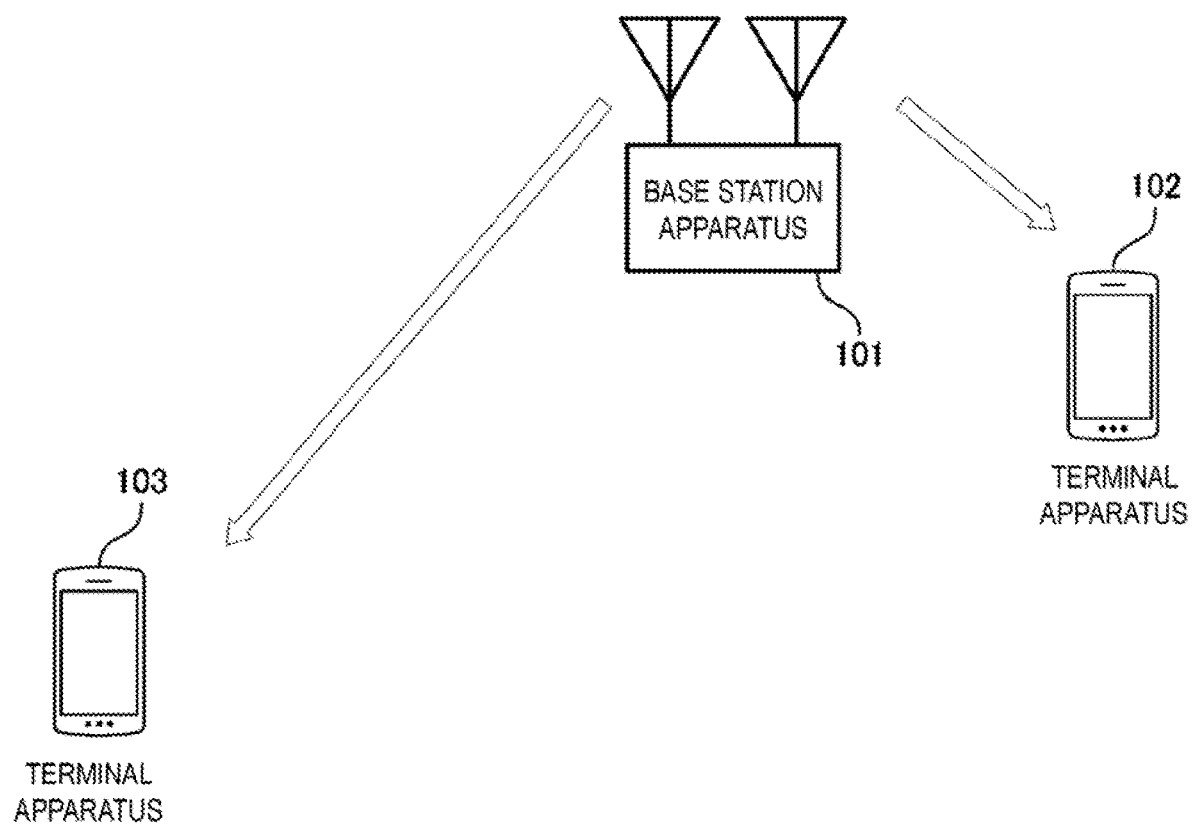
FIG. 1 is a schematic block diagram illustrating a configuration of a radio communication system according to the present embodiment.

The techniques discussed herein can be used in various kinds of wireless communication systems using Code Division Multiplexing Access (CDMA), Time Division Multiplexing Access (TDMA), Frequency Division Multiplexing Access (FDMA), Orthogonal FDMA (OFDMA), Single Carrier FDMA (SC-FDMA), and other access schemes. The terms "system" and "network" can often be used synonymously. The CDMA system may implement wireless technologies (standards) such as Universal Terrestrial Radio Access (UTRA) and cdma 2000 (trade name). UTRA includes broadband CDMA (WCDMA (trade name)) and other improved versions of CDMA. The system of cdma 2000 covers IS-2000, IS-95, and IS-856 standards. The TDMA system may implement a wireless technology such as Global System for Mobile Communications (GSM (trade name)). The OFDMA system may implement wireless technologies such as Evolved UTRA (E-UTRA), Ultra Mobile Broadband (UMB), IEEE 802.11 (Wi-Fi), IEEE 802.16 (WiMAX), IEEE 802.20, and Flash-OFDM (trade name).

3GPP Long Term Evolution (LTE) is an E-UTRA that employs OFDMA on the downlink and SC-FDMA on the uplink. LTE-A is a system, radio technology, and standard that has improved LTE. UTRA, E-UTRA, LTE, LTE-A and GSM (trade name) are described in documents from an organization named 3rd Generation Partnership Project (3GPP). The systems of cdma2000 and UMB are described in documents from an organization named 3rd Generation Partnership Project 2 (3GPP2). For clarity, certain aspects of the present technology are described below for data communication in LTE and LTE-A. The LTE terms and LTE-A terms are often used in the following descriptions.

Preferred embodiments of the present invention will be described below in detail with reference to the drawings. The detailed description that is disclosed below in conjunction with the accompanying drawings is for the purpose of illustrating example embodiments of the present invention and is not intended to be representative of the only embodiment in which the present invention may be practiced. The following detailed description includes specific details in order to provide a thorough understanding of the present invention. However, those skilled in the art will appreciate that the present invention may be practiced without such specific details. For example, although the following detailed description will be specifically described on the assumption that the mobile communication system is 3GPP LTE/LTE-A system, except for the specific matters of 3GPP LTE/LTE-A, the present invention is also applicable to any mobile communication system. In addition, terms to be described later are terms defined in consideration of functions in the present invention, and may vary depending on the user/operator's intention, practice and the like. Therefore, the terms should be defined based on the content throughout this specification.

In the description of the embodiments, the technical contents which are well known in the technical field to which the present invention belongs and which are not directly related to the present invention will not be described. This is to omit the unnecessary explanation, so that the gist of the present invention is not obscured and more clearly communicated. Thus, in some cases, in order to prevent the concept of the present invention from being obscured, known structure and apparatus are allowed to be omitted or illustrated in a form of a block diagram that focuses on the core functions of each structure and apparatus. Some components are exaggerated, omitted, or schematically illustrated in the drawings so that the gist of the present invention is not obscured and more clearly communicated. Also, the size of each component does not reflect the actual size. In addition, the same component will be described using the same reference numeral throughout the specification.

Throughout the specification, in a case that one part "includes" one component, this means that, unless specifically stated to the contrary, other components are not excluded and further included. Furthermore, the term "or" used in either the detailed description or the claims is intended to mean an inclusive "or" rather than an exclusive "or". Unless otherwise specified or clear from the context, the phrase "X employs A or B" is intended to mean any of the natural inclusive permutations. The phrase "X employs A or B" is satisfied by any of the following examples: X employs A; X employs B; or X employs both A and B. In addition, the articles "a" and "an" used in this application and the appended claims are to be construed as meaning "one or more" unless otherwise specified or otherwise evident from the context intended for the singular form. In addition, the terms "part", "equipment", "module", and the like described in the specification mean a unit for processing at least one function or operation, which may be realized by hardware, software or a combination of hardware and software.

In addition, in the following description, it is assumed that the terminal apparatus is a mobile or fixed user end apparatus such as a user equipment (UE), a mobile station (MS) or mobile terminal (MT), a mobile station apparatus, a mobile terminal, a subscriber unit, a subscriber station, a wireless terminal, a mobile apparatus, a node, a device, a remote station, a remote terminal, a wireless communication device, a wireless communication apparatus, a user agent, and an access terminal. The terminal apparatus may also be a cellular telephone, a cordless telephone, a Session Initiation Protocol (SIP) phone, a smartphone, a wireless local loop (WLL) station, a personal digital assistant (PDA), a tablet, a laptop, a handheld communication apparatus, a handheld computing apparatus, a satellite radio, a wireless modem card, a router, and/or a separate processing device for communicating through a wireless system. Also, the base station apparatus collectively refers to any node of the network end communicating with a terminal, such as a Node B, an enhanced Node B (eNode B), a base station, and an access point (AP). Note that, the base station apparatus shall include a Remote Radio Head (RRH), an apparatus having an outdoor radio section smaller than the base station apparatus, also referred to as Remote Radio Unit (RRU)) (also referred to as a remote antenna or a distributed antenna). The RRH can also be said to be a special form of the base station apparatus. For example, the RRH can be said to be a base station apparatus that includes only the signal processing unit, and allows another base station apparatus to configure parameters and determine scheduling for use in the base station apparatus.

The terminal apparatus of the present invention may be configured to include a memory for holding instructions related to various processes described below, and a processor coupled to the memory and configured to perform the instructions held in the memory. The base station apparatus of the present invention may be configured to include a memory for holding instructions related to various processes described below, and a processor coupled to the memory and configured to perform the instructions held in the memory.

Embodiments of the present invention will be described below in detail with reference to the drawings. Hereinafter, Channel State Information (CSI) is constituted by Rank Indicator (RI) for indicating a rank number, Precoding Matrix Indicator (PMI) for indicating an index of a precoding matrix, and Channel Quality Indicator (CQI) for indicating a combination of a modulation scheme and coding rate.

First Embodiment

FIG. 1 illustrates an example of a configuration of a radio communication system according to the present embodiment. The system includes a base station apparatus 101, a terminal apparatus 102, and a terminal apparatus 103. In FIG. 1, it is assumed that the terminal apparatus 102 is close to the base station apparatus, and the reception quality is high, while the terminal apparatus 103 is far from the base station apparatus, and the reception quality is lower than that of the terminal apparatus 102. Hereinafter, for the sake of convenience, the terminal apparatus 102 will be referred to as a nearby terminal apparatus and the terminal apparatus 102 will be referred to as a distant terminal apparatus. The number of antenna ports configured in each apparatus may be one or more. Here, the antenna port is not a physical antenna, but a logical antenna that can be recognized by a communication apparatus.

In the present embodiment, the base station apparatus 101 performs a configuration of the 64 QAM mode or the 256 QAM mode for the terminal apparatus 102 and the terminal apparatus 103. The 64 QAM mode means that the MCS table applied to the PDSCH is an MCS table including QPSK, 16 QAM, and 64 QAM (FIG. 2), and the CQI table used for feedback is a CQI table including QPSK, 16 QAM, and 64 QAM (FIG. 3). The 256 QAM mode means that the MCS table applied to the PDSCH is an MCS table including QPSK, 16 QAM, 64 QAM, and 256 QAM (FIG. 4), and the CQI table used for feedback is a CQI table including QPSK, 16 QAM, 64 QAM, and 256 QAM (FIG. 5). Each mode configuration is signaled from the base station apparatus to the terminal apparatus in RRC and the like. In LTE, the radio frame is constituted by a plurality of subframes. In the radio communication system according to the present embodiment, it is also possible to classify a radio frame into a plurality of sub-frame sets and to perform a configuration of the 64 QAM mode or the 256 QAM mode for each sub-frame set.

Figure 6:
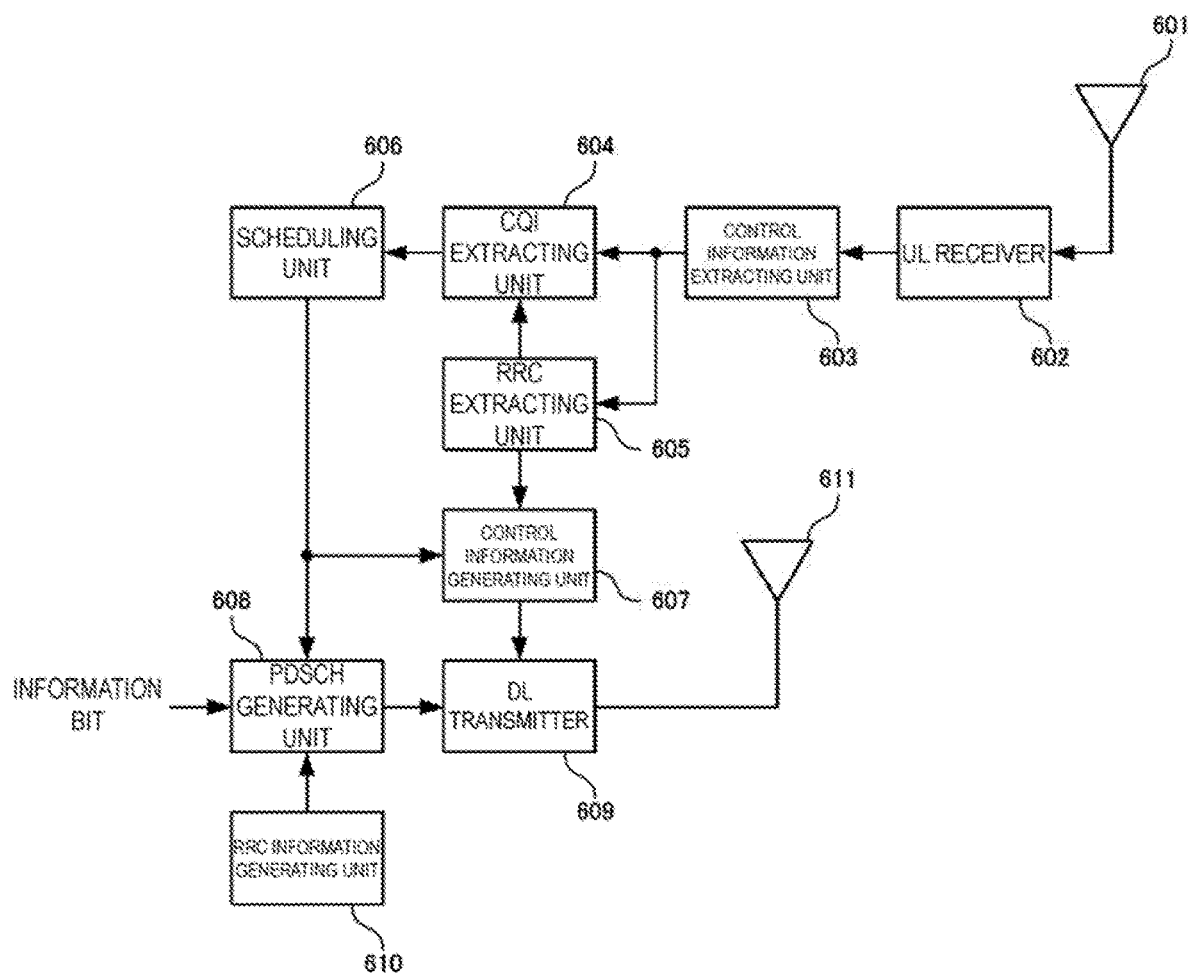
FIG. 6 is a diagram illustrating a configuration example of a base station apparatus according to the present embodiment.

Signals transmitted from the terminal apparatus 102 and the terminal apparatus 103 are received by the base station apparatus 101 via channel. FIG. 6 illustrates an example of a configuration of the base station apparatus 101. In FIG. 6, only blocks (processing units) necessary for describing the embodiment of the present invention are illustrated. Signals transmitted by the terminal apparatus 102 and the terminal apparatus 103 are received by the UL receiver 602 via the receive antenna 601. The receive antenna 601 is constituted by a plurality of antennas, and techniques such as receive diversity and adaptive array antenna may be applied. The UL receiver 602 performs processes such as down-conversion and Fourier transform. The output of the UL receiver 602 is input to the control information extracting unit 603. The control information extracting unit 603 extracts the control information transmitted by the terminal apparatuses 102 and 103. Here, the control information is control information transmitted using PUCCH (Physical Uplink Control CHannel) which is a channel dedicated to control information, or control information transmitted using PUSCH (Physical Uplink Shared CHannel) which is a channel for transmitting information data. The control information extracted by the control information extracting unit 603 is input to the CQI extracting unit 604 and the RRC extracting unit 605. The RRC extracting unit 605 extracts information, from the control information, indicating that configuration by RRC for each terminal apparatus has been performed in each terminal apparatus.

The CQI extracting unit 604 extracts the CQI index transmitted from the terminal apparatus 102 and the terminal apparatus 103 from the control information input from the control information extracting unit 603. Information (the combination of the modulation scheme and the coding rate) indicated by each CQI index is different between a case in which the terminal apparatus 102 and the terminal apparatus 103 transmit the CQI (meaning both the wideband CQI and the subband CQI, or either the wideband CQI or the subband CQI, in case of simply referring to as CQI) in the 64 QAM mode, and a case in which the terminal apparatus 102 and the terminal apparatus 103 transmit the CQI in the 256 QAM mode. In a case of determining that the terminal apparatus 102 or the terminal apparatus 103 has transmitted the CQI in the 64 QAM mode, the CQI extracting unit 604 interprets that the terminal apparatus 102 has notified the CQI index based on the CQI table of FIG. 3. In a case where the CQI extracting unit 604 determines that the terminal apparatus 102 or the terminal apparatus 103 has transmitted the CQI in the 256 QAM mode, the base station apparatus 101 interprets that the terminal apparatus 102 or the terminal apparatus 103 has notified the CQI index based on the CQI table of FIG. 5.

The CQIs of the terminal apparatus 102 and the terminal apparatus 103 that have been extracted by the CQI extracting unit 604 are input to the scheduling unit 606. The scheduling unit 606 determines resource allocation, MCS, and whether to apply MUST to the terminal apparatus 102 and the terminal apparatus 103, using the CQIs of the terminal apparatus 102 and the terminal apparatus 103. In a case of performing MIMO (Multiple Input Multiple Output) transmission on the downlink, scheduling is performed in consideration of RI (Rank Indicator) and PMI (Precoding Matrix Indicator) in addition to the CQI that are notified from the terminal apparatus 102 and the terminal apparatus 103.

Figure 7:
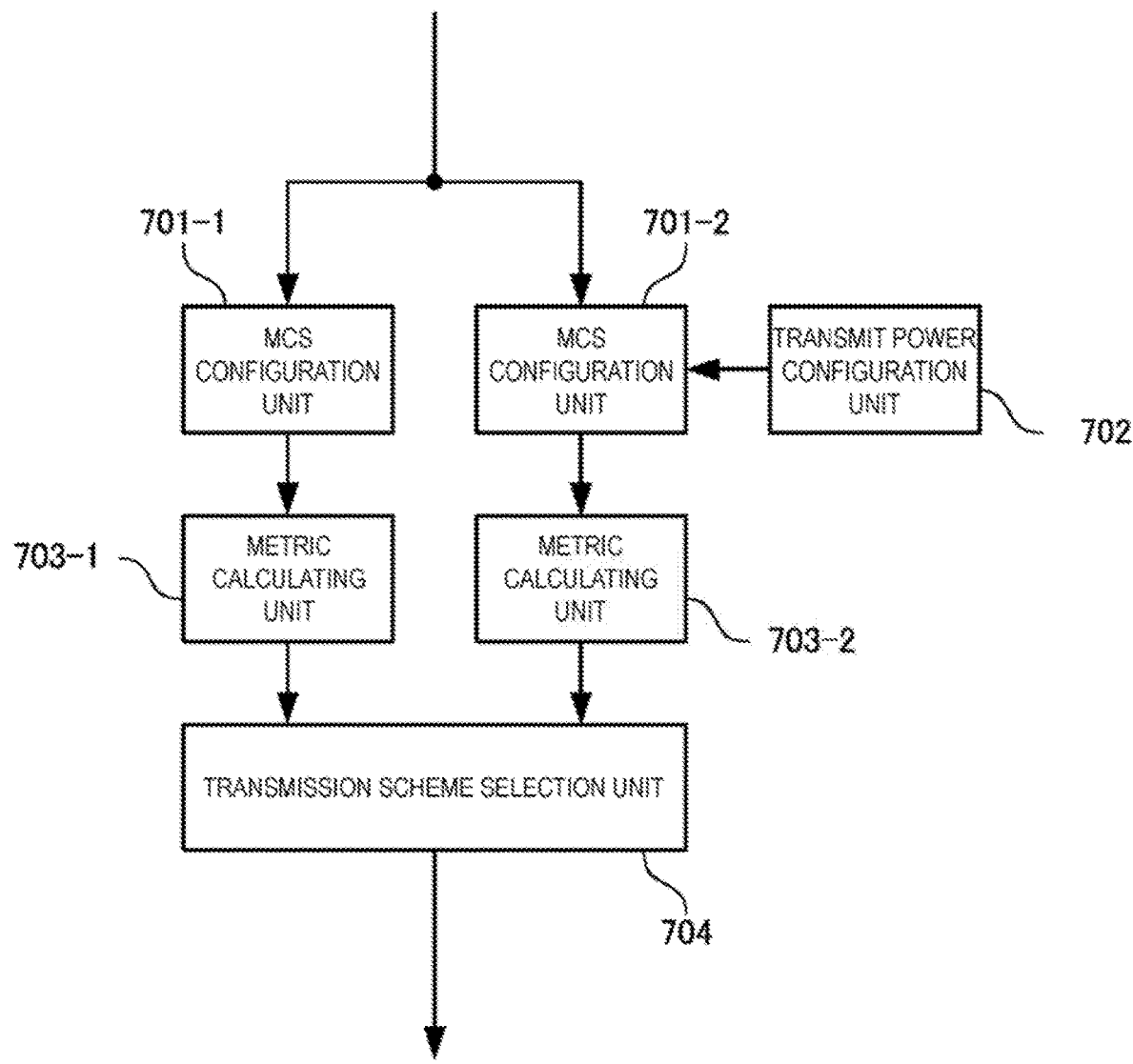
FIG. 7 is a diagram illustrating a configuration example of a scheduling unit according to the present embodiment.

FIG. 7 is a diagram illustrating an example of the configuration of the scheduling unit 206. In FIG. 7, a case to which a wideband scheduling using a wideband CQI (a scheduling method that allocates all resources to one terminal apparatus in a subframe to be scheduled) is applied will be described, but a scheduling using a subband CQI and the like can also be applied. The CQI information that has been input from the CQI extracting unit 604 is input to the MCS configuration unit 701-1 and the MCS configuration unit 701-2. The MCS configuration unit 701-1 configures, based on the input CQI information, the MCS to be used by each terminal apparatus in a case that MUST is not applied. The MCS configuration unit 701-2 configures the MCS to be used by each terminal apparatus in a case that MUST is applied. At the time of MCS configuration, the transmit power ratio configuration unit 702 inputs a transmit power ratio at which a multiplexing is to be performed in the terminal apparatus to which MUST is applied. In a case that the transmit power ratio configuration unit 702 has a plurality of transmit power ratios, the MCS configuration unit 701-2 may configure the MCS for some or all of the plurality of transmit power ratios.

The MCSs that have been configured by the MCS configuration unit 701-1 and the MCS configuration unit 701-2 are respectively input to the metric calculating unit 703-1 and the metric value calculating unit 703-2. The metric calculating unit 703-1 and the metric value calculating unit 703-2 calculate a metric using MCSs input from the MCS configuration unit 701-1 and the MCS configuration unit 701-2. The metric may be calculated in consideration of throughput, waiting time, and the like, of each terminal apparatus that have been observed until the present time. The metric calculating unit 703-1 calculates a metric for each terminal apparatus, and the metric calculating unit 703-2 calculates a metric for each combination of terminal apparatuses and for each transmit power ratio. The metrics for each terminal apparatus and the metrics for each combination of terminal apparatuses respectively output from the metric calculating unit 703-1 and the metric calculating unit 703-2 are input to the transmission scheme selection unit 704. The transmission scheme selection unit 704 selects the largest value out of the input metrics. The transmission scheme selection unit 704 outputs resource allocation information, MCS, and transmit power ratio that correspond to the selected value.

The signal output from the scheduling unit 606 is input to the PDSCH generating unit 608 and is also input to the control information generating unit 607. The control information generating unit 607 generates, in a DCI format, a signal of the input MCS, transmit power ratio information, and resource allocation information, together with other control information. Note that the transmit power ratio information does not necessarily have to be incorporated in the DCI format, and notifying of the transmit power ratio information may be omitted on the assumption that the terminal apparatus performs blind detection from the received signal waveform. The transmit power ratio may be a fixed value or may be quasistatically changed by using RRC signaling and the like. Only the ratio to the total transmit power may be notified as a transmit power ratio. Further, the transmit power ratio may take a value of 100% or 0%.

The PDSCH generating unit 608 performs encoding and modulation of the information bits addressed to the terminal apparatus 102 and the terminal apparatus 103, using MCS, the transmit power ratio information, and the resource allocation information that are input from the scheduling unit 606. In a case that MUST is applied, the PDSCH generating unit 608 adds signals based on the input transmit power ratio. The signal obtained by adding the signals is input to the DL transmitter 609. In a case that there is RRC information to be notified to the terminal apparatus 102 and the terminal apparatus 103 in the RRC information generating unit 610, the RRC information is input to the PDSCH generating unit 208, mapped to the PDSCH, and transmitted as the data signal addressed to the terminal apparatus 102 and the terminal apparatus 103. The RRC information is information notified as RRC signaling and includes modulation mode configuration which is configuration information of the modulation mode (256 QAM mode and 64 QAM mode), CSI request configuration which is a configuration of a serving cell set or a specific serving cell that correspond to the value of a CSI request area, and the like.

The DL transmitter 609 multiplexes the signals input from the PDSCH generating unit 608 and the control information generating unit 607, and then performs processes such as inverse discrete Fourier transform, band limiting filtering, and up-conversion. A signal output from the DL transmitter 609 is transmitted to the terminal apparatus 102 and the terminal apparatus 103 via the transmit antenna 611.

Next, a case where the mode of the modulation scheme of the terminal apparatus 102 (the nearby terminal apparatus namely) is the 64 QAM mode or the 256 QAM mode will be described. In the case of the 64 QAM mode, the CQI extracting unit 604 interprets that the terminal apparatus 102 has notified the CQI index based on the CQI table of FIG. 3, and calculates the reception quality of the terminal apparatus 102. Further, the scheduling unit 606 selects an MCS based on the MCS table in FIG. 2. On the other hand, in the case of the 256 QAM mode, the CQI extracting unit 604 interprets that the terminal apparatus 102 has notified the CQI index based on the CQI table of FIG. 5, and calculates the reception quality of the terminal apparatus 102.

Here, the selection of an MCS based on the MCS table of FIG. 5 is considered in the scheduling unit 606. In a case that MUST is applied in the 256 QAM mode, since only a part of the transmit power is allocated to the terminal apparatus 102, the probability that 256 QAM which requires high reception quality is selected is low. Therefore, a number of elements in the MCS table of FIG. 4 are not used. Since the number of elements of QPSK and 16 QAM in the MCS table of FIG. 4 is less than that of FIG. 2, an optimum MCS cannot be selected. Therefore, in the present embodiment, in a case that MUST is applied, even if 256 QAM is configured, the MCS is selected based on the MCS table of FIG. 2 that does not support 256 QAM, and the MCS index to be notified to the terminal apparatus 102 is also determined based on the MCS table of FIG. 2. As a result, a control with high accuracy can be performed for the terminal apparatus to which MUST is applied and for which 256 QAM or 64 QAM is no longer selected due to the reduced transmit power.

Since the terminal apparatus 102 is notified of whether MUST is applied through the transmit power ratio information described above, the terminal apparatus 102 can recognize whether MUST is applied by receiving the transmit power ratio information. In a case that MUST is applied, regardless of whether the 256 QAM mode is configured or the 64 QAM mode is configured in the RRC, the terminal apparatus determines that the MCS index has been notified based on the MCS table of the 64 QAM mode, namely the MCS table of FIG. 2, and performs demodulation and decoding. Note that in a case that the transmit power ratio information is not notified from the base station apparatus 101 and the application of MUST is detected by blind detection from the received signal waveform (reception signal point), a mechanism is employed by which the MCS table of FIG. 2 is applied, regardless of the configured mode, to only the terminal apparatus 102 that needs to detect, by blind detection, whether MUST is applied. Since the terminal apparatus 102 to which a small transmit power ratio is assigned needs to recognize that MUST is applied, and remove, from the received signal, a signal addressed to the terminal apparatus 103 to which a large power is allocated, a mechanism is employed by which the MCS table of FIG. 2 is applied to the terminal apparatus 102 regardless of the configured mode at the time of applying MUST. On the other hand, since the terminal apparatus 103 to which a large transmit power ratio is assigned can accurately detect a signal without recognizing that MUST is applied, the terminal apparatus 103 does not necessarily have to detect whether MUST is applied. Therefore, the terminal apparatus 103 applies the MCS table according to the configured mode. Note that in a case that the terminal apparatus 103 can recognize whether MUST is applied, a similar mechanism may be employed, namely the mechanism by which the MCS table of FIG. 2 is applied to the terminal apparatus 103 which is a distant terminal apparatus regardless of the configured modulation mode (64 QAM mode or 256 QAM mode) at the time of applying MUST.

Figure 8:
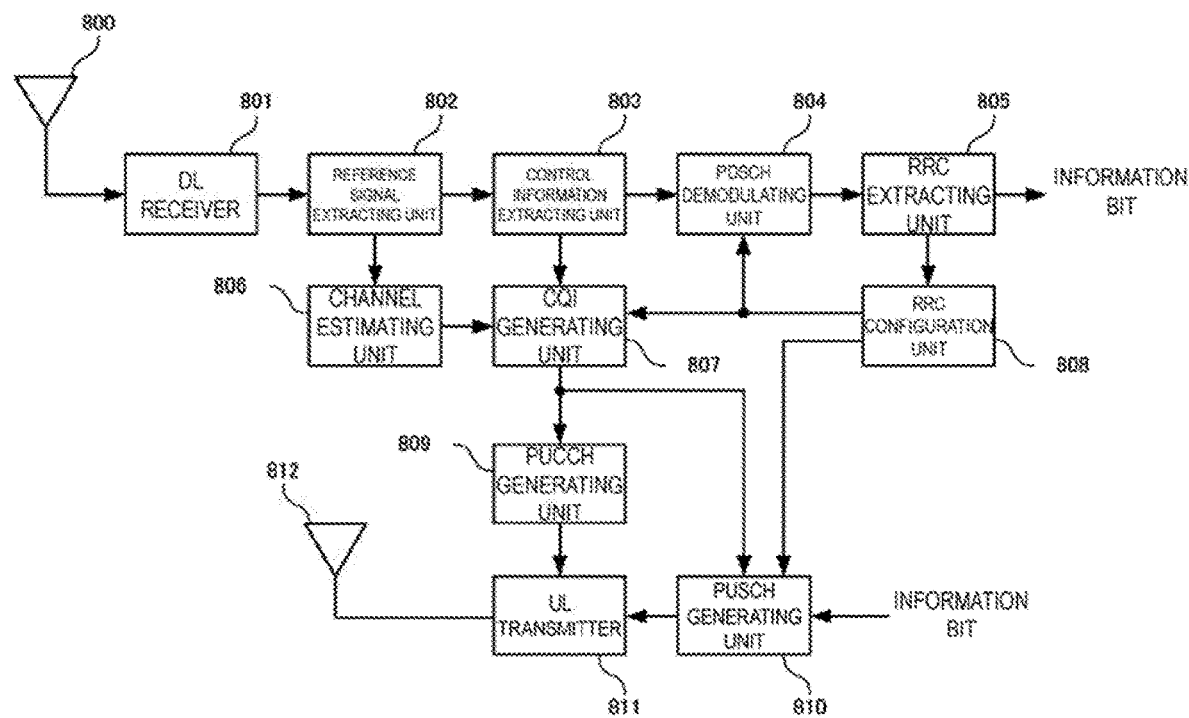
FIG. 8 is a diagram illustrating a configuration example of a terminal apparatus according to the present embodiment.

The signal transmitted from the base station apparatus 101 is received by the terminal apparatus 102 and the terminal apparatus 103 via channel. FIG. 8 illustrates an example of a configuration of the terminal apparatus 102. The terminal apparatus 103 has a similar configuration. The signal received by the receive antenna 800 is input to the DL receiver 801, and processes such as down-conversion, band-limiting filtering, and discrete Fourier transform are applied. The signal output from the DL receiver 801 is input to the reference signal extracting unit 802. The reference signal extracting unit 802 extracts a reference signal such as CRS (Cell-specific Reference Signal), CSI-RS (Channel State Information Reference Signal), and DMRS (UE-specific Reference Signal, or Demodulation Reference Signal) transmitted from the base station apparatus 101 and inputs the reference signal to the channel estimating unit 806. The channel estimating unit 806 estimates a channel state (propagation path state) between the base station apparatus 101 and the terminal apparatus 102 using the input reference signal. The estimated value of the estimated channel state is input to the CQI generating unit 807. The estimated value of the estimated channel state, which is not illustrated in FIG. 8, is also input to the control information extracting unit 803 and the PDSCH demodulating unit 804, and is used for demodulating the signals mapped to the PDCCH and the PDSCH.

A signal other than the reference signal extracted by the reference signal extracting unit 802 is input to the control information extracting unit 803. For example, a signal mapped to the PDCCH is input to the control information extracting unit 803.

The control information extracting unit 803 extracts, from the received signal, a radio resource by which information on control information (downlink control information, or DCI format) has been transmitted. The control information extracting unit 803 applies blind decoding to the extracted radio resource. At this time, the terminal apparatus 102 descrambles the CRC with C-RNTI and SPS C-RNTI, and regards the one that can be accurately decrypted as the transmitted control information. Out of the decoded control information, information on resource allocation (resource allocation information), information on MCS index of PDSCH, transmit power ratio information and information as to whether the information is control information decrypted with C-RNTI or control information decrypted with SPS C-RNTI (hereinafter referred to as C-RNTI information) are input to the PDSCH demodulating unit 804. In a case that the transmit power ratio information is not included in the control information, the terminal apparatus can estimate the transmit power ratio information from the received signal waveform (blind detection).

The output of the control information extracting unit 803 is input to the PDSCH demodulating unit 804. For example, a signal mapped to the PDSCH is input to the PDSCH demodulating unit 804. The PDSCH demodulating unit 804 demodulates the PDSCH using the resource allocation information and the MCS information (MCS index, and information on the MCS index) input from the control information extracting unit 803. At this time, in a case of recognizing that MUST is not applied based on the transmit power ratio information input from the control information extracting unit, the PDSCH demodulating unit 804 selects a MCS table to refer to based on the modulation mode configuration (64 QAM mode, 256 QAM mode) input from the RRC configuration unit 808, determines a MCS from the selected MCS table and the notified MCS index, and use the determined MCS for demodulation. For example, in a case that the 64 QAM mode is configured in the RRC configuration unit, the PDSCH demodulating unit 804 determines an MCS from the MCS index based on the MCS table in FIG. 2. In a case that the 256 QAM mode is configured, the PDSCH demodulating unit 804 determines an MCS from the MCS index based on the MCS table of FIG. 4.

On the other hand, in a case of recognizing that MUST is applied based on the transmit power ratio information input from the control information extracting unit 803, the PDSCH demodulating unit 804 determines an MCS from the MCS index based on the MCS table not supporting 256 QAM of FIG. 2 regardless of whether the 64 QAM mode or the 256 QAM mode is configured. Note that, either the MCS table of FIG. 2 or the MCS table of FIG. 4 may be used depending on whether the transmit power ratio is larger or smaller than a predetermined value rather than whether MUST is performed.

In this manner, the PDSCH demodulating unit 804 according to the present embodiment uses either the MCS table configured by RRC signaling, or the MCS table not supporting the 256 QAM according to the information on whether MUST is applied. In a case that information indicating that MUST is applied is input, regardless of the configuration of RRC signaling (configuration of modulation mode), an MCS is determined by the MCS table that does not support 256 QAM. On the other hand, in a case that information indicating that MUST is not applied is input, the MCS table corresponding to the configuration of RRC signaling (configuration of modulation mode) is used. As a result, in a subframe to which MUST is not applied, the terminal apparatus to which the 256 QAM mode is applied can perform high-speed transmission using 256 QAM, and in a subframe to which the MUST is applied, although 256 QAM cannot be received, the use of low granularity MCS table can prevent the transmission efficiency from being degraded. Also, on the premise that there is no concurrent use of 256 QAM and MUST, the base station apparatus may notify, as common control information, whether the 256 QAM mode and MUST can be applied in a subframe unit.

As described above, according to the embodiment of the present invention, 256QAM can be applied in a subframe to which MUST is not applied, and a control with high accuracy can be performed by the use of an MCS table not including 256QAM in a subframe to which MUST is applied. In the present embodiment, an example is described that switches the MCS tables standardized in LTE Rel-12 in FIG. 2 and FIG. 4. In addition, at the time of applying MUST, an MCS table optimized for MUST may be used. Examples of the MCS table optimized for MUST may include a table configuration with only QPSK and 16 QAM, the number of 64 QAM elements less than that of the MCS table in FIG. 2, and the like.

The output of the PDSCH demodulating unit 804 is input to the RRC extracting unit 805. In a case that the input signal includes RRC signaling, the RRC extracting unit 805 extracts the RRC signaling and inputs the extracted RRC signaling to the RRC configuration unit 808. The RRC configuration unit 808 controls each processing unit of the terminal apparatus 102 using the control information transmitted from the base station apparatus 101 by RRC signaling. This means that RRC configuration unit 808 performs processing for configuring control parameters. For example, the RRC configuration unit 808 determines a subframe (subframe set) to which MUST can be applied, and a subframe (subframe set) to which MUST is not applied, based on the MUST mode configuration notified by RRC signaling.

The CQI generating unit 807 generates information on CQI (for example, CQI Index) using the channel estimation value input from the channel estimating unit 806, and the modulation mode configuration (configuration of either the 64 QAM mode or the 256 QAM mode) input from the RRC configuration unit 808. The CQI includes a wideband CQI which is a CQI of the entire system band and a subband CQI which is a CQI of each subband at the time of dividing the system band into a plurality of subbands. The CQI generating unit 807 selects a CQI table to be used for generating the CQI index based on the input modulation mode configuration regardless of the configuration of MUST. The CQI generating unit 807 selects one of the CQI indices of a certain CQI table based on the input channel estimation value. The CQI generating unit 807 quantizes the channel quality obtained from the channel estimation value based on the CQI table of FIG. 3, and selects a CQI index that obtains a predetermined error rate, for the subframe (the downlink subframe, the subframe set, the downlink subframe set) in which the 64 QAM mode is configured. The CQI generating unit 807 inputs the selected CQI index to the PUCCH generating unit 809 or the PUSCH generating unit 810. The CQI generating unit 807 quantizes the channel quality obtained from the channel estimation value based on the CQI table of FIG. 5 including 256 QAM, and selects a CQI index that obtains a predetermined error rate, for the subframe (the downlink subframe, the subframe set, the downlink subframe set) in which the 256 QAM mode is configured. The CQI generating unit 807 inputs the selected CQI index to the PUCCH generating unit 809 or the PUSCH generating unit 810. Methods for notifying a CSI include a method in which a CSI is periodically notified and another method in which a CSI is aperiodically notified. For transmission of periodic CSI (Periodic CSI, or P-CSI), PUCCH or PUSCH is used. For transmission of aperiodic CSI, PUSCH is used.

Second Embodiment

It has been described that, in the first embodiment, in a case that MUST is applied in the subframe, control is performed based on a table of MCS not including 256 QAM, not based on a table of MCS including 256 QAM. In the present embodiment, a description will be given about a method for efficiently performing MUST even in a case of a control based on the MCS table including 256 QAM at the time of applying MUST.

The base station configuration of the present embodiment is the same as that of the first embodiment, and as the main difference lies in the configuration of the scheduling unit 606, processing in the scheduling unit 606 will be described with reference to FIG. 7. The MCS configuration unit 701-1 determines an MCS based on the MCS table illustrated in FIG. 4 for the terminal apparatus 102 to which the 256 QAM mode is applied. The MCS configuration unit 701-2 determines an MCS based on the MCS table illustrated in FIG. 4 for the terminal apparatus 102 to which the 256 QAM mode is applied, but 256 QAM, or the indexes 20 to 27 in FIG. 4 are not used. Other processing is similar to that of the first embodiment. The above restriction to the MCS configuration unit 701-2 causes the scheduling unit 606 not to select 256 QAM, or MCSs of the indices 20 to 27 in the MCS table of FIG. 4 and apply MUST at the same time.

Next, processing of the terminal apparatus 102 will be described. In a case that the MCS table including 256 QAM is configured for use as a MCS table, and that the modulation scheme used for transmission is within a range from QPSK to 64 QAM, namely, the MCS index is within a range from 0 to 19, the control information extracting unit 803 of the terminal apparatus 102 determines whether MUST is applied by blind detection or signaling, and inputs the information on the application of MUST to the PDSCH demodulating unit 804. On the other hand, in a case that the modulation scheme used for transmission is 256 QAM, namely, the MCS index is within a range of 20 to 27, the control information extracting unit 803 of the terminal apparatus 102 does not perform blind detection and inputs information that MUST is not applied to the PDSCH demodulating unit 804.

In this way, MUST is not applied in a case that 256 QAM is applied, and blind detection can be avoided in a case that an MCS index to use 256 QAM is notified. This is effective in the reduction of the power consumption in the terminal, the avoidance of complexity, and the reduction of detection error.

Third Embodiment

In the first and second embodiments, a configuration of MUST, in a case that the 256 QAM mode is configured, has been described. In the present embodiment, processing will be described that is required to prevent MUST from being applied in a case of 256 QAM mode configuration.

In the scheduling unit 606 of the present embodiment, the MCS configuration unit 701-2 is configured not to configure an appropriate MCS for the terminal apparatus 102 to which the 256 QAM mode is applied. Alternatively, the metric calculating unit 703-2 is configured to configure a value to zero, an extremely low value, and the like. Alternatively, the transmission scheme selection unit 704 is configured not to select a candidate to which MUST is applied. This prevents MUST from being applied to the terminal apparatus 102 in the 256 QAM mode, and allows for a configuration to perform only OMA (Orthogonal Multiple Access) transmission. The MCS configuration unit 701-1 and the MCS configuration unit 701-2 may be configured to configure an MCS according to the MCS table of FIG. 4 not including 256 QAM, even in a case that the 256 QAM mode is configured for the terminal apparatus 102 to which MUST mode is applied. In the above description, the control information generating unit 607 generates an MCS index based on the referred MCS table. The MUST mode refers to a state in which MUST is configured by RRC or a state in which the terminal apparatus 102 or the terminal apparatus 103 has informed, to the base station apparatus 101, that MUST is applicable.

LTE Rel-12 makes it possible to configure a CQI table for the 64 QAM mode and a CQI table for the 256 QAM mode for each subframe set. However, MCS cannot be configured for each subframe set. MCS can be configured for each terminal apparatus. In a case that MUST is configured for each terminal apparatus, and not for each subframe set, the terminal apparatus 102 needs to calculate, by blind detection, whether MUST is applied for all subframes. Therefore, in the present embodiment, the RRC information generating unit 610 generates control information for configuring MUST for each subframe set. The RRC extracting unit 803 of the terminal apparatus 102 is configured to extract information on the configuration of MUST for each subframe set. The RRC configuration unit 808 is configured to configure MUST for each subframe set. The control information extracting unit 803 is capable of preventing a determination of the application of MUST from being performed based on blind detection for a subframe set for which MUST is not configured. Since the blind detection is not needed in a subframe set for which MUST is not configured, an effect such as the reduction of the power consumption in the terminal, the avoidance of complexity, and the reduction of detection error will be achieved. In addition, a MUST mode can be configured for each subframe set, and thus allowing the terminal apparatus to apply MUST in the subframe set performing the CQI report in the 64 QAM mode, and not to apply the MUST in the subframe set performing the CQI report in the 256 QAM mode. In combination with the first embodiment, the terminal apparatus is allowed to perform the CQI report in the 64 QAM mode and a transmission in the 64 QAM mode using the MCS table in the subframe set for which MUST is configured, and to perform the CQI report in the 256 QAM mode and a transmission in the 256 QAM mode using the MCS table in the subframe set for which MUST is not configured.

A program running on an apparatus according to the present invention may be a program that controls a Central Processing Unit (CPU) and the like, such that the program causes a computer to operate in such a manner as to realize the functions of the above-described embodiment according to the present invention. The program or information handled by the program are temporarily read into a volatile memory, such as a Random Access Memory (RAM) while being processed, or stored in a non-volatile memory, such as a flash memory or a Hard Disk Drive (HDD) and then read by the CPU to be modified or rewritten, as necessary.

Note that the apparatus in the above-described embodiment may be partially enabled by a computer. In that case, a program for realizing the functions of the embodiments may be recorded on a computer readable recording medium. This may be implemented by causing a computer system to read and perform a program recorded on this recording medium. It is assumed that the "computer system" mentioned here refers to a computer system built into the apparatus, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, each functional block or various characteristics of the apparatus used in the above-described embodiment may be implemented or performed on an electric circuit, namely, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, a conventional processor, a controller, a microcontroller, or a state machine. The above-mentioned electric circuit may be configured with a digital circuit, or may be configured with an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited thereto, and is applicable to a terminal apparatus or a communication apparatus of a fixed-type or a stationary-type electronic equipment installed indoors or outdoors, for example, an AV equipment, a kitchen equipment, a cleaning or washing machine, an air-conditioning equipment, office equipment, a vending machine, and other household equipment.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments obtained by suitably combining technical elements disclosed in the different embodiments are also included in the technical scope of the present invention. Furthermore, a configuration in which a constituent element that achieves the same effect is substituted for the one that is described in the embodiments is also included in the technical scope of the present invention.

INDUSTRIAL APPLICABILITY

The present invention can be preferably used in a base station apparatus, a terminal apparatus, and a communication method.

The present international application claims priority based on JP 2016-070495 filed on Mar. 31, 2016, and all the contents of JP 2016-070495 are incorporated in the present international application by reference.

REFERENCE SIGNS LIST

101 Base station apparatus
102, 103 Terminal apparatus
601 Receive antenna
602 UL receiver
603 Control information extracting unit
604 CQI extracting unit
605 RRC extracting unit
606 Scheduling unit
607 Control information generating unit
608 PDSCH generating unit
609 DL transmitter
610 RRC generating unit
611 Transmit antenna
701-1, 701-2 MCS configuration unit
702 Transmit power ratio configuration unit
703-1, 703-2 Metric calculating unit
704 Transmission scheme selection unit
800 Receive antenna
801 DL receiver
802 Reference signal extracting unit
803 Control information extracting unit
804 PDSCH demodulating unit
805 RRC extracting unit
806 Channel estimating unit
807 CQI generating unit
808 RRC configuration unit
809 PUCCH generating unit
810 PUSCH generating unit
811 UL transmitter
812 Transmit antenna

The invention claimed is:
1. A base station apparatus configured and/or programmed to communicate with a terminal apparatus, the base station apparatus comprising:
scheduling circuitry and downlink (DL) transmission circuitry, wherein
the scheduling circuitry is configured and/or programmed to select one of a plurality of modulation and coding scheme (MCS) indices, the DL transmission circuitry is configured and/or programmed to:
- transmit radio resource control (RRC) information indicating whether a first table or a second table is applied and
- transmit downlink control information (DCI) that includes the one of the plurality of MCS indices and power allocating information indicating whether multi-user superposition transmission (MUST) is applied or not, in a case that the RRC information indicates that the second table is applied and the power allocation information indicates that the MUST is applied, the one of the plurality of MCS indices indicates that one of QPSK, 16QAM, and 64QAM is configured as an MCS for the terminal apparatus out of QPSK, 16QAM, 64QAM, and 256QAM, and in a case that the power allocation information indicates that the MUST is not applied, the one of the plurality of MCS indices indicates that one of QPSK, 16QAM, 64QAM, and 256QAM is configured as the MCS for the terminal apparatus based on the first table or the second table.

2. The base station apparatus according to claim 1, wherein
a cyclic redundancy check (CRC) scrambled by cell-radio network temporary identifier (C-RNTI) is attached to the DCI.

3. The base station apparatus according to claim 1, wherein
the one of the plurality of MCS indices is one of integers among 0 to 31 excluding 20 to 27.

4. A base station apparatus configured and/or programmed to communicate with a terminal apparatus, the base station apparatus comprising:
modulation and coding scheme (MCS) configuration circuitry and downlink (DL) transmission circuitry, wherein
the MCS configuration circuitry is configured and/or programmed to select one of a plurality of MCS indices,
the DL transmission circuitry is and/or programmed configured to transmit radio resource control (RRC) information indicating whether a first table or a second table is applied, the first table not including 256QAM, the second table including 256QAM, and transmit downlink control information (DCI) that includes the one of the plurality of MCS indices indicating the MCS and power allocating information indicating whether multi-user superposition transmission (MUST) is applied or not, and transmit downlink data on a physical downlink shared channel (PDSCH),
in a case that the power allocation information indicates that the MUST is applied, the RRC information indicates that the first table is applied and the DL transmission circuitry is configured and/or programmed to transmit the downlink data on the PDSCH by applying the MUST and using an MCS indicated by the one of the plurality of MCS indices, the MCS being one of QPSK, 16QAM, and 64QAM, and
in a case that the power allocation information indicates that the MUST is not applied, the DL transmission circuitry is configured and/or programmed to transmit the downlink data on the PDSCH using an MCS indicated by the one of the plurality of MCS indices based on the first table or the second table and without applying the MUST, the MCS being one of QPSK, 16QAM, 64QAM and 256QAM.

5. A terminal apparatus configured and/or programmed to communicate with a base station apparatus, the terminal apparatus comprising:
modulation and coding scheme (MCS) configuration circuitry and downlink (DL) reception circuitry, wherein
the MCS configuration circuitry is configured and/or programmed to select one of a plurality of MCS indices,
the DL reception circuitry is configured and/or programmed to receive radio resource control (RRC) information indicating whether a first table or a second table is applied and receive downlink control information (DCI) that includes the one of the plurality of MCS indices and power allocating information indicating whether multi-user superposition transmission (MUST) is applied or not, in a case that the RRC information indicates that the second table is applied and the power allocation information indicates that the MUST is applied, the one of the plurality of MCS indices indicates that one of QPSK, 16QAM, and 64QAM is configured as an MCS for the terminal apparatus out of QPSK, 16QAM, 64QAM, and 256QAM, and in a case that the power allocation information indicates that the MUST is not applied, the one of the plurality of MCS indices indicates that one of QPSK, 16QAM, 64QAM, and 256QAM is configured as the MCS for the terminal apparatus based on the first table or the second table.

6. The terminal apparatus according to claim 5, wherein
a cyclic redundancy check (CRC) scrambled by cell-radio network temporary identifier (C-RNTI) is attached to the DCI.

7. The terminal apparatus according to claim 5, wherein
the one of the plurality of MCS indices is one of integers among 0 to 31 excluding 20 to 27.

8. A terminal apparatus configured and/or programmed to communicate with a base station apparatus, the terminal apparatus comprising:
modulation and coding scheme (MCS) configuration circuitry and downlink (DL) reception circuitry, wherein
the MCS configuration circuitry is configured and/or programmed to select one of a plurality of MCS indices indicating an MCS configured for the terminal apparatus,
the DL reception circuitry is configured and/or programmed to receive radio resource control (RRC) information indicating whether a first table or a second table is applied, the first table not including 256QAM, the second table including 256QAM, and transmit downlink control information (DCI) that includes the one of the plurality of MCS indices and power allocating information indicating whether multi-user superposition transmission (MUST) is applied or not, and transmit downlink data on a physical downlink shared channel (PDSCH),
in a case that the power allocation information indicates that the MUST is applied, the RRC information indicates that the first table is applied and the DL reception circuitry is configured and/or programmed to receive the downlink data on the PDSCH, the PDSCH being multiplexed by applying the MUST and using the MCS indicated by the one of the plurality of MCS indices, the MCS being one of QPSK, 16QAM, and 64QAM, and in a case that the power allocation information indicates that the MUST is not applied, the DL reception circuitry is configured and/or programmed to receive the downlink data on the PDSCH, the PDSCH being transmitted using an MCS indicated by the one of the plurality of MCS indices based on the first table or the second table and without applying the MUST, the MCS being one of QPSK, 16QAM, 64QAM, and 256QAM.

9. A communication method for a base station apparatus configured to communicate with a terminal apparatus, the communication method comprising:

selecting one of a plurality of modulation and coding scheme (MCS) indices indicating an MCS configured for the terminal apparatus, transmitting radio resource control (RRC) information indicating whether a first table or a second table is applied and transmit downlink control information (DCI) that includes the one of the plurality of MCS indices indicating and power allocating information indicating whether multi-user superposition transmission (MUST) is applied or not, in a case that the RRC information indicates that the second table is applied and the power allocation information indicates that the MUST is applied, the one of the plurality of MCS indices indicates that one of QPSK, 16QAM, and 64QAM is configured as the MCS for the terminal apparatus out of QPSK, 16QAM, 64QAM, and 256QAM, and in a case that the power allocation information indicates that the MUST is not applied, the one of the plurality of MCS indices indicates that one of QPSK, 16QAM, 64QAM, and 256QAM is configured as the MCS for the terminal apparatus based on the first table or the second table.

10. A communication method for a terminal apparatus configured to communicate with a base station apparatus, the communication method comprising:

selecting one of a plurality of modulation and coding scheme (MCS) indices indicating an MCS configured for the terminal apparatus, receiving radio resource control (RRC) information indicating whether a first table or a second table is applied and receive downlink control information (DCI) that includes the one of the plurality of MCS indices indicating and power allocating information indicating whether multi-user superposition transmission (MUST) is applied or not, in a case that the RRC information indicates that the second table is applied and the power allocation information indicates that the MUST is applied, the one of the plurality of MCS indices indicates that one of QPSK, 16QAM, and 64QAM is configured as the MCS for the terminal apparatus out of QPSK, 16QAM, 64QAM, and 256QAM, and in a case that the power allocation information indicates that the MUST is not applied, the one of the plurality of MCS indices indicates that one of QPSK, 16QAM, 64QAM, and 256QAM is configured as the MCS for the terminal apparatus based on the first table or the second table.

* * * * *